April 5, 1960   E. DURBIN ET AL   2,932,022
HYPERBOLIC NAVIGATION RECEIVER
Filed Aug. 20, 1956   2 Sheets-Sheet 1
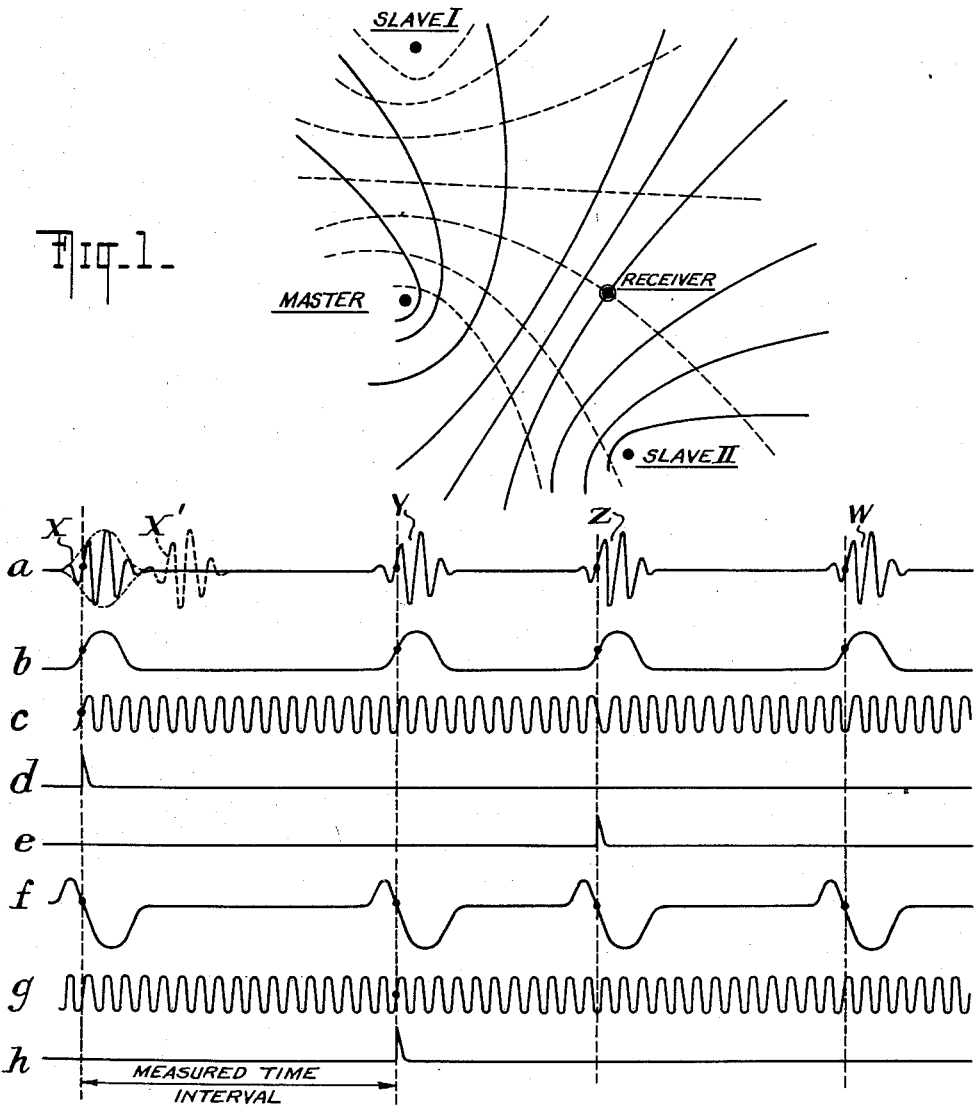
Fig. 1.
Fig. 3.
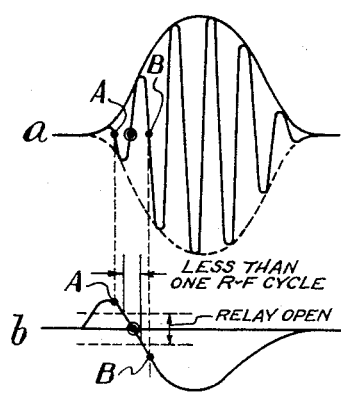
Fig. 4.
INVENTORS
EDWARD DURBIN
WILBERT P. FRANTZ
BY
ATTORNEY

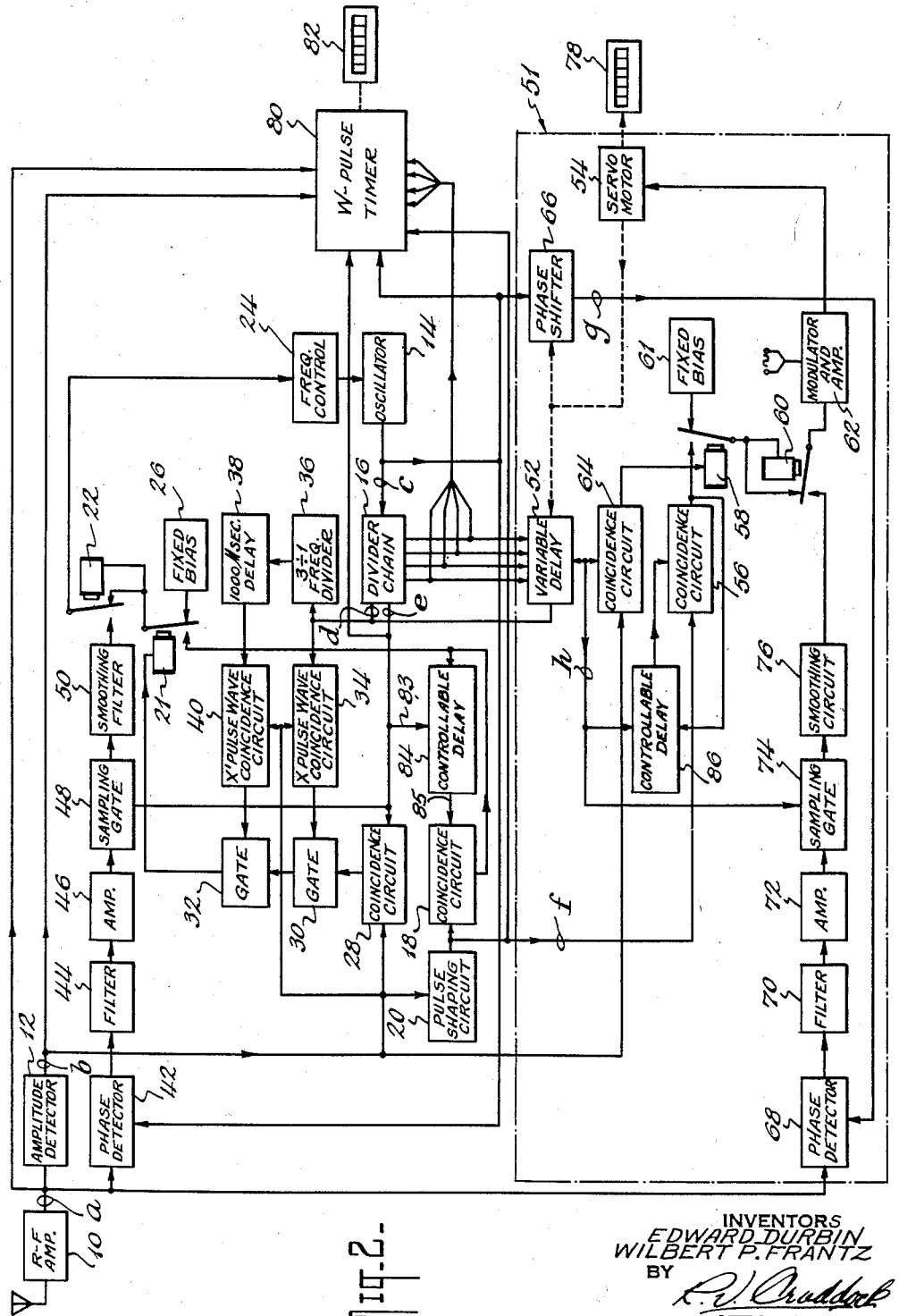

United States Patent Office 2,932,022
Patented Apr. 5, 1960

2,932,022
HYPERBOLIC NAVIGATION RECEIVER

Edward Durbin, Valley Stream, and Wilbert P. Frantz, Great Neck, N.Y., assignors to Sperry Rand Corporation, a corporation of Delaware Application August 20, 1956, Serial No. 605,686

8 Claims. (Cl. 343—103)

This invention relates to radio receivers for hyperbolic navigation systems, and more particularly, is concerned with improved receiving apparatus for automatically and accurately indicating the time difference between radio frequency pulses produced by master and slave stations in a loran type navigation system.

Radio navigational systems of the type for determining a hyperbolic line of position are well known in the art. In these systems, and particularly in the case of loran, this line of position is determined by measuring at the receiving station the difference in travel time of two pulsed radio signals which are transmitted from two known locations. Given the velocity of radio wave propagation, the difference in travel time can be converted to a difference in distance from the two known locations. The difference in distance determines a hyperbolic line of position along which the receiver must be located.

Standard loran systems use frequencies of the order of 1850 kc. and a pulse duration approximately 40 microseconds. Ground wave range over water is limited to approximately 800 miles and is considerably less over land. In an effort to extend the ground wave range, to simplify operation and to obtain higher accuracy, low frequency loran systems have been established and tested at an allocated frequency of 100 kc. Due to bandwidth limitations of not more than 20 kc. at the latter frequency, the rise time of the transmitted pulses is required to be at least 50 microseconds and the minimum length of the pulse cannot be less than 100 microseconds. Since it is desired that the maximum error of measurement be limited to considerably less than the length of the pulse, the time measurement must be made between corresponding points on the pulses, for example, the point of inflection on the rising edge of the pulses. The longer the rise time, however, the more difficult it is to determine with precision a particular point on the pulse envelope for time measurement purposes.

As a result, pulse matching has been proposed in which time measurements are made, not only between points on the envelope of the pulses but also between corresponding points on the R-F cycles of the radio frequency carrier comprising the pulse envelope. The time of a point on an R-F cycle, such as a zero crossover point, can be determined with much greater precision than a point on the pulse envelope because the slope of the cycle on passing through zero must necessarily be much steeper than the slope of the pulse envelope containing the cycle.

One difficulty in using the cycle matching technique in which the time measurement is made between zero crossover points in the cycles of the respective pulses is that unless the corresponding crossover points in relation to the respective pulse envelopes are used, the time measurement will be in error by the amount of a cycle or more. This is to say that a cyclic ambiguity can exist in the cycle matching technique of time measurement since a number of zero crossover points for the cycles exist during the received pulses.

One solution to the problem of accomplishing cycle matching without cyclic ambiguity is disclosed and claimed in copending U.S. application 574,475, filed March 28, 1956, in the name of W. Palmer, now U.S. Patent No. 2,873,445 issued Feb. 10, 1959. Said patent application deals with an automatic cycle matching receiver, also described herein by way of example, requiring in its operation a fixed predetermined phase relationship between the radio frequency cycles comprising the pulses emitted by the transmitting stations and the respective envelopes thereof. Such a receiver is hereinafter termed a "fixed-phase receiver." In a fashion somewhat analogous to the use of a vernier micrometer, a coarse measurement is made via a pulse envelope match after which a fine or precision measurement is made using the radio frequency cycles occurring at the same time at which the envelope match is made. Inasmuch as the measured envelope and cycle are in fixed predetermined phase relationship with respect to each other, they are mutually "calibrated" and a single precision reading may be obtained.

In operation, an envelope match is first made which coarsely controls the time measuring apparatus to be more fully described hereinafter. When said envelope match is determined to be within ±one-half cycle of the R-F cycle occurring at the same time, control of the time measuring apparatus is taken away from the envelope matching means and given over to the cycle matching means for final precision adjustment. The stability of the point at which cycle control of the time measuring apparatus is caused to supersede envelope control thereof depends on the maintenance of the aforementioned fixed predetermined phase relationship between the pulse envelope and the R-F cycles comprising it which relationship is carefully regulated at the transmitting stations.

It has been observed, however, that variations such as moisture content and temperature of the electromagnetic wave propagating medium affects the relative envelope-to-cycle phase relationship at the position of the remote time-measuring receiver. Additionally, the receiver itself may have a phase versus frequency characteristic such that changes in receiver tuning, for example, produced by ambient temperature effects, varies the envelope-to-cycle phase of the received signal. Although both transmission path and receiver-induced relative phase errors normally are not so severe as to cause ambiguity in cycle selection, they have been found to produce instability of the point at which control of the receiver time measuring apparatus is given over to the cycle matching means.

It is the general object of this invention to provide a stabilized automatic cycle matching receiver of the fixed-phase type for use in a pulsed hyperbolic navigation system.

A more specific object of this invention is to provide an improved cycle matching receiver of the fixed-phase type adapted to operate under conditions of limited envelope-to-cycle phase drift of received pulses.

Another object of this invention is to divorce, over a predetermined range, operation of a fixed-phase receiver envelope matching means from that of its cycle matching means.

A further object of the present invention is to stabilize the point at which the envelope matching means control of a fixed-phase receiver time measuring apparatus is superseded by cycle matching means.

Still another object of this invention is to provide an auxiliary variable delay envelope sampling means responsive to the envelope matching servo error signal, These and other objects of the invention which will become apparent as the description proceeds are basically achieved by the provision of a receiver comprising a local oscillator and divider for generating respectively a C.-W. signal at the R-F frequency of the received signals and for generating pulses at the pulse repetition frequency of the received master pulses. A first servo loop, responsive to a first set of local pulses and the received master pulse envelopes, controls the frequency of the oscillator to establish coincidence between the first set of local pulses and the received master pulses. A second servo loop, responsive to the carrier of the received master pulses and the output of the oscillator, alternatively controls the frequency of the oscillator to establish phase coherence between the local C.-W. signal and the carrier of the received master pulses. A switching circuit on the input to the oscillator frequency control is arranged to provide control of the oscillator by the first servo until coincidence between the first set of local and received master pulses is achieved within predetermined limits of accuracy, as defined by a certain first servo error signal, whereupon the second servo is permitted to take over control to complete a cycle match for more accurate control of the local oscillator.

The apparatus so far described is the subject of the aforementioned copending application S.N. 574,475. The present invention specifically lies in the provision of a first auxiliary servo loop, also controlled by the first servo error signal but within predetermined limits, to maintain a minimum first servo error signal in the event that envelope-to-cycle phase drift of the received pulses should occur particularly while the second servo is controlling the oscillator. To this end, a first controllable delay device is provided, responsive to the amplitude of the first servo error signal, to produce a second set of local pulses which is controllably delayed with respect to the first set of local pulses. The second set of local pulses whose time position is controlled both by the first servo loop and, over predetermined limits, by the first auxiliary servo loop, is then caused to track the received master pulses so as to reduce the first servo error signal to a minimum.

Assuming that the second servo loop is controlling the oscillator of the time measuring apparatus and that envelope-to-cycle phase drift of the received pulses persists so that the limits of the controllable delay device are exceeded, the first servo error signal will begin to increase in amplitude and finally cause the control of the oscillator to revert to the first servo loop. The existing first servo loop signal then controls the oscillator to reposition the first and second sets of local pulses so that coincidence between the second set of local pulses and the received master pulse envelope is reestablished whereupon the second servo loop again takes over control of the oscillator for a precision time measurement.

In a fashion similar to that taught in copending application Ser. No. 574,475, the time measurement is basically achieved by the provision of third and fourth servo loops for respectively controlling a variable delay network and a variable phase shifter which are mechanically ganged together and are coupled respectively to the outputs of the divider and oscillator. The third servo loop, responsive to a first set of delayed pulses from the variable delay network and the slave pulses, controls the delay network to establish coincidence between the first set of delayed pulses and the slave pulses. The fourth servo loop, responsive to the output of the variable phase shifter and the carrier of the received slave pulses, controls the phase shifter to establish phase coherence between the slave carrier and the phase shifter output. A switching circuit on the input to the variable delay network and phase shifter control means is arranged to provide control by the third servo loop until coincidence between the local pulses and the received slave pulses is achieved and then to permit the fourth servo loop to take over and complete a cycle match, whereby coarse and fine adjustment of the ganged variable delay network and phase shifter is achieved. A mechanical counter, ganged with the variable delay network and the phase shifter, indicates the correct time measurement.

A second auxiliary servo loop, similar to the above-mentioned first auxiliary servo loop, is also provided to maintain a minimum third servo error signal in the event that envelope-to-cycle phase drift of the received slave pulses should occur particularly while the fourth servo is controlling the variable delay network and phase shifter control means. Said second auxiliary servo loop includes a second controllable delay device, responsive to the amplitude of the third servo error signal to produce a second set of delayed pulses, which is controllably delayed over predetermined limits with respect to the first set of delayed pulses from the variable delay network. The second set of delayed pulses whose time-position is controlled both by the third servo loop and, over predetermined limits, by the second auxiliary servo loop, is then caused to track the received slave pulses so as to reduce the third servo error signal to a minimum.

For a better understanding of the invention, reference should be had to the accompanying drawings wherein:

Fig. 1 is a diagram illustrating the principles of loran navigation;

Fig. 2 is a block diagram of a representative embodiment of a fixed-phase navigation receiver wherein provision is made, according to the present invention, for envelope-to-cycle phase drift of the received pulses;

Fig. 3 shows the waveform of and time relationship among the various signals generated by the apparatus disclosed in Fig. 2; and Fig. 4 is a series of graphical plots used for explaining the pulse matching and cycle matching operation of the apparatus of Fig. 2.

Copending U.S. application Serial No. 574,475 discloses a fixed-phase pulse receiving apparatus, described herein by way of example, which is conveniently modified in accordance with the present invention to yield more stable operation under conditions of relative phase drift between the received and detected pulse envelopes and the respective radio frequency cycles comprising them. In the aforesaid application, receiving apparatus is provided for automatically measuring the time intervals between the pulses produced by a low frequency triad loran transmitting system in which the phase of the radio frequency cycles produced by the master and slave stations are synchronized in phase with each other. Moreover the transmitters provide pulses having the same fixed predetermined phase relationship between the R-F cycles and the pulse envelopes.

There are three transmitters forming the loran triad, a master station and first and second slave stations positioned so that the transmission pattern of each station covers the region which the system serves, as shown in the diagram of Fig. 1. The master station is arranged to transmit pulses of R-F energy at fixed time intervals and at a fixed repetition rate. One of the slave stations radiates a pulse at a fixed time after one pulse from the master station, and the other slave station radiates a pulse at a fixed time after the next pulse from the master station. Pulses as received at the receiving station are represented in Fig. 3a, in which the two master station pulses are designated X and Z respectively with the pulse from the first slave station being designated Y and the pulse from the second slave station being designated W. In order to identify the X pulses from the master station to establish a repetition interval, an X′ pulse is provided, for example, which is merely the X pulse delayed a brief interval of time, such as 1,000 microseconds, every third recurrence of the X pulse.

The receiving station receives the respective pulses at times dependent upon the distance between the receiving station and the respective transmitters as well as the time relationships between the master and slave pulses. Each hyperbolic curve indicated by a solid line in Fig. 1 shows the locus of receiving points for which the time delay between the master pulses Z and slave pulses W has a certain constant value. Each hyperbolic curve indicated by a dashed line shows the locus of receiving points for which the time delay between the master pulses X and slave pulses Y has a certain constant value. Thus the time delay between the Z and W pulses and between the X and Y pulses at a receiving station located within the radiation pattern of the three transmitters serve to determine two hyperbolic curves on which the receiving station is located. The intersection of the two hyperbolic curves, as plotted on a suitable loran chart determines the point at which the receiving station is situated.

The time relationship between the master and slave pulses is such that an X pulse is received prior to the corresponding Y pulse and a Z pulse is received prior to the corresponding W pulse at any receiving point within the region which the system serves. Furthermore, the time relationship is such that at any receiving point within the region which this system serves, the Y pulses are received only during the interval of time between the X and Z pulses and the W pulses are received only during the interval of time between the Z and X pulses. Thus the sequence of the signals which occur at the receiving point during each recurrence period is X, Y, Z, and W as indicated in Fig. 3a.

Referring to Fig. 2, the numeral 10 indicates generally a radio frequency amplifier for receiving and amplifying the incoming master and slave signals. The output of R-F amplifier 10, having the waveform as shown in Fig. 3a, is coupled to an amplitude detector 12 from which the pulse envelopes of the received signals are derived, as shown in Fig. 3b.

The receiver further includes a local oscillator 14, which is preferably crystal controlled to provide a highly stable oscillator whose output frequency is substantially equal to the carrier frequency of the received signals. The output of the oscillator, as shown in Fig. 3c, is coupled to a divider chain 16 that preferably includes a series of blocking oscillator dividers followed by a bistable multibrator. Two trigger pulse trains are derived from the divider chain in which the trigger pulses occur at substantially the repetition rate of the X pulses from the master station. The pulses in the two trigger pulse trains are displaced a half repetition period from each other, so that by proper phasing with relation to the incoming pulses as derived from the amplitude detector 12, the pulses of one trigger pulse train can be made coincident with the X pulses and the pulses of the other pulse train can be made coincident with the Z pulses. The waveforms of the trigger pulse trains derived from the divider circuit 16 are shown in Figs. 3d and 3e.

In order to synchronize the trigger pulses from the divider chain 16 with the received X and Z pulses, one of the trigger outputs, such as the triggers at the output e of the divider chain 16 are applied via lead 83, controllable delay 84 and lead 85 to a coincidence circuit 18. The coincidence circuit is also coupled to the output of the amplitude detector 12 by means of a pulse shaping circuit 20, which preferably is a circuit arranged to take the derivative of the received pulse envelope from the amplitude detector 12 and combine it with the inverse of the received pulse envelope to produce an output pulse having a waveform shown in Fig. 3f and also in Fig. 4b. A suitable pulse shaping or derivative circuit is shown in the disclosure of U.S. patent application Serial No. 471,170 filed March 26, 1954 in the name of Robert L. Frank.

The coincidence circuit 18 is arranged to produce a D.C. output voltage that varies in magnitude depending on the degree of coincidence between the output of the pulse shaping circuit 20 and the output of controllable delay 84. A suitable coincidence circuit is described in Patent No. 2,636,988. The output of the coincidence circuit 18 is a function of the time relation between the output of the pulse shaping circuit 20 and the output of controllable delay 84, and has the same form as the curve of Fig. 4b. Thus, the output of the coincidence circuit 18 goes to zero when the controllably delayed trigger pulses from the divider chain 16 are coincident with the crossover point 0 of the output pulses from the pulse shaping circuit 20 and varies substantially linearly between the points A and B on either side of the crossover point 0 as the time relationship between the delayed triggers and the derived pulses varies.

The output of the coincidence circuit 18 is coupled to a second input of controllable delay 84 and through a pair of switching relays 21 and 22 in series, when the relays are energized (in a manner hereinafter to be described), to an automatic frequency control circuit 24 associated with the oscillator 14. The frequency control circuit 24 may be a conventional reactance tube circuit used in well known automatic frequency control systems by means of which the frequency of the oscillator 14 is shifted in response to the output of the coincidence circuit 18 so as to bring the triggers at the output of controllable delay 84 into coincidence with the crossover point of the derived pulse from the pulse shaping circuit 20. In a manner hereafter to be more fully described, the output of coincidence circuit 18 controls the frequency of oscillator 14 only after the delay limits of controllable delay 84 have been exceeded, before which point controllable delay 84 alone operates to maintain coincidence between its own output and the said crossover point.

Before the coincidence circuit 18 can be used to control the oscillator 14, it is necessary that the trigger pulses at the output e of the divider chain 16 be brought into substantial coincidence with the crossover point of the derived enevelope pulse from the pulse shaping circuit 20. Furthermore, it is necessary that the trigger from the divider chain 16 be brought into substantial coincidence with the Z pulse and be prevented from locking into coincidence with the received X, Y, or W pulses.

For this reason the relay 21 is provided which normally connects a fixed bias source 26 to the second relay 22. The fixed bias is of sufficient magnitude to close the relay 22 thereby connecting the output of the fixed bias to the frequency control circuit 24. The effect of the fixed bias is to reduce the frequency of the oscillator 14 whereby the pulse repetition rate of the triggers at the output of the divider chain 16 is made slower than the repetition rate of the incoming pulses. The relay 21 is energized only when the controllably delayed triggers from the divider chain 16 are brought into substantial coincidence with the proper received pulse. The time constant of the relay 22 is such that it does not open when the current through the relay 22 is momentarily interrupted by the switching of relay 21 from fixed bias control to control by the coincidence circuit 18.

The relay 21 is energized in response to the output of a coincidence circuit 28 to which is coupled trigger pulses from the output e of the divider chain 16 and also the envelope pulses from the amplitude detector 12. The output of the coincidence circuit 28, which is similar to the coincidence circuit 18, is coupled through a pair of gate circuits 30 and 32 to the relay 21 when substantial coincidence occurs between the trigger and the envelope pulses. If the gates 30 and 32 are open, the relay 21 will be energized.

In order to insure that the coincidence circuit 28 synchronizes with the Z pulses without ambiguity, use is made of the pulse X', which, as described above, occurs every third cycle when the X pulse is delayed at the transmitter a thousand microseconds. Triggers from the output d of the divider chain 16 are coupled to an X pulse coincidence circuit 34 which controls the gate 30 and through a 3:1 divider circuit 36 and thousand microsecond delay 38 to a coincidence circuit 40 which controls the gate 32. The coincidence circuits 34 and 40 are also coupled to the output of the amplitude detector 12. Only when the triggers from the output d of the divider chain 16 are in coincidence with the X pulses will both the gates 30 and 32 be opened. Thus, the relay 21 can only be energized when the triggers from the output d of the divider chain 16 are in substantial coincidence with the received X pulses.

In order to effect more accurate time measurement by cycle matching in an automatic receiver system of the type used with present invention, it is necessary that the output of the oscillator 14 be made phase coherent with the carrier of the received master pulses. This is achieved by a second servo loop for controlling the oscillator 14 which includes a phase detector 42 coupled to the output of the oscillator 14 and to the output of the R-F amplifier 10. The output of the phase detector 42 is proportional to the cosine of the phase angle between the input signals and goes to zero only when the carrier is 90° out of phase with the local oscillator signal.

The output of the phase detector 42 is filtered by the filter circuit 44 to remove the R-F components and is coupled through an amplifier 46 to a sampling gate 48. The sampling gate 48 is triggered open by the trigger pulses from the ouput e of the divider chain 16 so that the output of the phase detector is sampled only during the leading edge of the received Z pulses. A suitable sampling gate circuit is described in more detail in the copending application Serial No. 91,659 filed May 6, 1949 in the name of Philip W. Crist, now U.S. Patent No. 2,811,716, Oct. 29, 1957.

The output from the sampling gate 48 is coupled to a smoothing circuit 50 which may be a low pass filter, or integrating circuit having a long time constant, whereby the output of the smoothing circuit 50 is proportional to the D.-C. component of the output of the sampling gate 48. The output of the smoothing circuit 50 is connected by the relay 22 to the frequency control circuit 24 whereby, when the relay 22 is open, the oscillator 14 is adjusted in frequency to bring the output of the oscillator into phase coherence with the carrier of the Z pulse.

From the description thus far and neglecting for the moment the operation of controllable delay 84 it will be seen that two basic servo loops are provided, one involving the coincidence circuit 18 for achieving a pulse match between the output of the divider chain and the incoming pulse envelopes, and a second servo loop including a phase detector 42 for providing phase coherence between the output of the oscillator 14 and the R-F carrier of the master pulses. The two servo loops include the same local C.-W. source and pulse generating source in the oscillator 14 and divider chain 16. Adjustment of either the pulse repetition rate by the first servo loop or the frequency by the second servo loop necessarily affects both the pulse repetition rate and the frequency at the same time. Therefore the phase relation between the received carrier and pulse envelope must be a fixed predetermined amount so that coincidence between the locally generated triggers and the received pulses is maintained by the second servo loop. In this way the second servo loop acts as a fine adjustment on the coincidence of the received pulses and the locally generated triggers.

In the operation, the fixed bias 26 causes the oscillator frequency to be low so that the local triggers shift in phase with respect to the received pulses until substantial coincidence between the locally generated triggers pulses and the received master pulse envelopes occurs. The first envelope servo matching is then brought into operation by the relay 21 to adjust the oscillator so as to maintain coincidence between the locally generated triggers and the received master pulse envelopes. By operation of the relay 22, when alignment between the triggers and the received pulses is achieved, extremely accurate control of the oscillator 14 is achieved by the cycle matching servo to maintain phase coherence between the oscillator and the received master carrier signal.

The point at which relay 22 operates so as to divorce oscillator 14 from the relatively coarse control of the envelope servo and to transfer control thereof to the cycle matching servo is determined by a maximum allowable error voltage output of coincidence circuit 18. As previously mentioned, in order to preclude cyclic ambiguity in the final precision adjustment of oscillator 14, it is imperative that the envelope match made at the zero crossover point 0 of Fig. 4b by coincidence circuit 18 be within ± one-half cycle of the simultaneously occurring R-F cycle of the received pulse. The amplitude of the voltage output of coincidence circuit 18 is a measure of the degree of precision with which the envelope match is made. Thus, knowing the characteristic output of coincidence circuit 18, as represented in Fig. 4b, an output voltage amplitude can be determined below which the envelope match is deemed to be within the ± one-half cycle of R-F required before control of oscillator 14 is transferred, by relay 22, to the cycle matching servo.

It will be seen that after control of oscillator 14 is taken over by the cycle matching servo, the envelope matching circuit continues to operate and, in a sense, monitor the envelope matching error voltage produced at the output of coincidence circuit 18. In the event that there is no envelope-to-cycle phase drift of the received pulses, the envelope matching error voltage will remain below the level necessary to energize relay 22. However, in the presence of any persistent envelope-to-cycle phase drift, said error voltage will build up and finally exceed the energizing threshold of relay 22 whereupon control of oscillator 14 reverts back to the envelope matching servo despite the fact that the cycle matching servo has been accurately controlling oscillator 14 up to that point and would have so continued but for the action of relay 22.

In order to preclude premature operation of relay 22 after control of oscillator 14 is given over to the cycle matching servo and in the presence of envelope-to-cycle phase drift of the received pulses, the present invention makes use of controllable delay 84 to maintain the error voltage output of coincidence circuit 18 below the threshold of relay 22 for all limited envelope-to-cycle phase drift which is less than the amount required to cause cyclic ambiguity. In the event that said drift continues beyond the required amount, the limits of controllable delay 84 will be exceeded and the error voltage output of coincidence circuit 18 will increase without compensation until relay 22 is operated and envelope control of oscillator 14 is restored.

The output e of divider 16 is coupled to a first input to controllable delay 84, a second input to which is derived from the output of coincidence circuit 18. Controllable delay 84 may be any well-known device, such as a phantastron circuit which produces an output pulse at a controllable time after the occurrence of an input pulse as a function of the amplitude of a control voltage. Thus, pulses e are delayed in controllable delay 84 a length of time determined, over specified limits, by the amplitude of the error voltage output of coincidence circuit 18 to maintain, in typical servo fashion, said error voltage at a minimum.

In order to make a time measurement between the X and Y pulses, a Y pulse timer circuit, indicated generally at 51, is provided having a second similar pair of servo loops to control locally generated triggers in coincidence with the Y pulses and to control a local C.-W. signal in phase coherence with the carrier of the Y pulses. Coincidence between the locally generated pulses and the received Y pulses is produced by means of a variable delay circuit 52 coupled to the trigger pulse output of the divider chain 16, which is preferably of the type described in Patent No. 2,621,238. The variable delay 52 utilizes a plurality of harmonically related signals derived from the divider chain 16 to produce output pulses that are accurately controlled in time in response to a shaft rotation. A servomotor 54 actuates the input shaft of the variable delay circuit 52 to produce the desired delay in the delay circuit 52. The output of the delay circuit 52 is shown in Fig. 3h.

The delay output triggers from the variable delay circuit 52 are coupled to a coincidence circuit 56 via controllable delay 86. Coincidence circuit 56 is similar to the above-described coincidence circuit 18. The coincidence circuit 56 is also coupled to the output of the derivative circuit 20. The coincidence circuit produces a D.-C. error signal indicative of the displacement between the delayed trigger and the crossover point of the derived Y pulse from the derivative circuit 20. This error signal from the coincidence circuit, as modified by the operation of controllable delay 86 in a fashion similar to that of the above described controllable delay 84, is connected through a relay 58 and relay 60 to a modulator and amplifier circuit 62 by means of which it controls the A.-C. servomotor 54. The relay 58 is arranged so that it normally connects a fixed bias 61 to the relay 60, energizing the relay 60 to connect the fixed bias to the input of the modulator and amplifier circuit 62. The relay 58 in turn is controlled by the output of a coincidence circuit 64 coupled to the delayed trigger pulse from the variable delay circuit 52 and to the output of the amplitude detector 12. When substantial coincidence occurs between the Y pulse and the trigger from the delay circuit 52, the coincidence circuit 64 closes the relay 58 thereby interrupting the fixed bias and providing control of the servomotor 54 by the output of the coincidence circuit 56. The servomotor is controlled by the coincidence circuit 56 to make the output trigger from the delay circuit 52, as further delayed by controllable delay 86, coincident with the crossover point of the derived Y pulse from the derivative circuit 20.

In order to provide an accurate time measurement involving cycle matching, when the coincidence circuit 56 produces substantial match between the local trigger and the received Y pulses, the output of the coincidence circuit 56 is reduced substantially to zero permitting the relay 60 to drop out and connect a cycle matching servo loop to the servomotor 54 as hereinafter described.

The cycle matching loop includes a variable phase shifter 66 coupled to the output of the local oscillator 14. The output of the phase shifter 66, shown in Fig. 3g, is coupled to a balanced phase detector 68 where it is compared with the phase of the carrier of the received pulses from the R.-F. amplifier 10. The output of the phase detector 68 is a voltage pulse wave whose amplitude is proportional to the cosine of the phase angle between the two waves which are compared. This output voltage is applied to a filter 70 for removing the R.-F. components of the phase detector output. The filtered signal is coupled through an amplifier 72 to a sampling gate 74, similar to the sampling gate 48, but triggered by the output of the variable delay circuits 52. Thus the output of the phase detector is sampled during the leading edge of the received Y pulses. The output of the sampling gate is applied to a smoothing circuit 76, similar to the smoothing circuit 50 described above, by which a signal proportion to the D.-C. component of the sampling gate output signal is derived. The output of the smoothing circuit 76 is connected by the relay 60 to the modulator and amplifier 62 to the servomotor 54 which adjusts the phase shifter 66 to reduce the output of the phase detector 68 to zero.

The phase shifter 66 is preferably a continuously variable type such as described in Patent No. 2,627,598 and is mechanically ganged to the variable delay circuit 52 by suitable mechanical linkage (not shown) which permits one complete revolution, corresponding to a 360° phase shift, of the phase shifter 66 for a change in delay time equal to one period at the frequency of the carrier of the received signals. The same fixed relationship between the triggers from the divider chain 16 and the cycles of the local oscillator output is set and maintained by the mechanical linkage between the delay triggers and the phase shifted output. This fixed linkage, as well as the fixed coupling between the oscillator 14 and divider 16, requires a substantially fixed phase relationship between the carrier and envelope of the received signals for unambiguous time measurement, as will hereinafter be more fully described.

Referring to Fig. 4, Fig. 4a shows a received pulse, for example a Y pulse from the slave station with its R.-F. cycle content. Fig. 4b shows the output of the derivative circuit 20 resulting from the Y pulse of Fig. 4a. Fig. 4b also represents the change in voltage at the output of the coincidence circuit 56 as a function of the time relationship between the output of the derivative circuit 20 and the delayed trigger from the controllable delay circuit 86. It will be seen that if the relay 60 is caused to open when the output from the coincidence circuit 56 is reduced to the region indicated by the horizontal dotted lines in Fig. 4b, the phase shifter 66 will be adjusted to within one cycle of the desired crossover point of the R.-F. signal at 0 in Fig. 4a. Thus the effect of the pulse matching servo loop including the coincidence circuit 56 is to resolve the cyclic ambiguity that otherwise would exist between the output of the phase shifter and the received pulse carrier signal if cycle matching alone were used to make a time measurement.

By providing a suitable counter, as indicated at 78, coupled to the output of the servomotor 54, an accurate time measurement between the X and Y pulses as measured between a particular cycle crossover point in the carrier of the X pulse and corresponding crossover point in the carrier signal of the Y pulse is provided. Since, when the relay 60 drops out, the output of the phase shifter 66 must be adjusted within plus or minus a half cycle of the desired R.-F. carrier crossover point, it is necessary that the phase relationship between the R.-F. carrier and the Y pulse envelope be fixed within an error of less than ± half an R.-F. cycle. Otherwise when the relay 60 opens, the cycle matching servo loop including the phase detector 68 adjusts the phase shifter 66 to a cycle before or a cycle after the desired R.-F. cycle crossover point and the reading of the counter 78 will be in error by the period of one cycle.

The specific contribution of the present invention to the problem of unambiguous cycle selection, and as provided by the operation of the controllable delay circuits 84 and 86 is that premature operation of relays 22 and 60, respectively, is avoided under conditions of envelope-to-cycle phase drift in the received master and slave pulses, respectively, which drift is less than that which would produce ambiguity in cycle selection. Particularly where said relative drift is first plus and then minus within limits less than that which would cause cyclic ambiguity, the invention provides for continuous control of the time measuring apparatus by the cycle matching servos so that indicator 78 smoothly exhibits a correct time difference reading between the X and Y pulses.

A similar time measurement for the W pulse is made by a W pulse timer circuit indicated generally at 80 which controls a suitable counter 82 on which the time interval between the Z and W pulses is indicated. The W pulse timer is identical to the Y pulse timer circuit 51 except that the input trigger to the variable delay in the W pulse timer 80 is derived from the e output of the divider chain 16 instead of the d output, whereby the W pulse timer measures the interval from the Z pulse, rather than the X pulse as in the Y pulse timer 51.

The time indications on the counters 78 and 82 identify the hyperbolic lines of position on a loran chart. The point of intersection between these two hyperbolic lines of position then provides a fix corresponding to the position of the receiving station, as described in connection with Fig. 1. The ultimate accuracy of the indications of the counters 78 and 82 is improved by comparing the phase of corresponding zero crossover points of the R.-F. cycles of the respective pulses. Cyclic ambiguity is resolved by adjusting the time difference to within ± a half cycle by measuring the time difference between the pulse envelopes first and then switching over to the cycle matching only when the time difference has been brought within this error.

The cycle matching arrangement of the present invention, in which a local oscillator is made phase coherent with the carrier of the master pulse and the phase shift required to make the output of the oscillator phase coherent with the R.-F. signal of the slave pulse is then measured, has heretofore been described in application Serial No. 92,797 filed May 12, 1949 in the name of Winslow Palmer. However, in the system therein disclosed no means was shown for resolving the cyclic ambiguity as such nor was any means shown for compensating for limited envelope-to-cycle phase drift of the received pulses, but entirely separate time measurement of the pulse time difference was made by a pulse time comparator. The present invention provides a completely automatic system having the accuracy of cycle matching technique of time measurement which produces a single time difference reading in which any cyclic ambiguity error has been eliminated.

From the above description it will be seen that the various objects of the invention have been achieved by the provision of a completely automatic loran type receiver. The receiver achieves improved accuracy over standard loran by incorporating cycle matching in making time measurements. While the receiver is particularly adapted for operation in a low frequency long range loran system, it is not limited to low frequency system operation.

More particularly, it should be noted that the present invention, which provides for stable operation of a completely automatic loran receiver of the fixed-phase type under conditions of limited envelope-to-cycle phase drift of the received pulses, is not limited to the specific structures shown in Fig. 2 which are used for purposes collateral to making a time difference determination. For example, application of the present invention is not limited to the particular apparatus shown for distinguishing between the plurality of pulses transmitted from the master and slave stations.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Receiving apparatus for phase synchronizing a local pulse source and a local signal source to the envelopes and component carrier cycles, respectively, of received radio pulses, said radio pulses being transmitted with a predetermined phase relationship between the envelopes and the component carrier cycles thereof, said apparatus comprising a local pulse source and a local signal source phase synchronized and harmonically related thereto operating, respectively, at a repetition rate and a frequency substantially the same as those of the radio pulses, the pulses of said local pulse source and the signals of said local signal source having substantially the same predetermined phase relationship therebetween as obtains between the envelope and carrier cycles of said radio pulses, controllable delay means to produce delayed local pulses related to said local pulses over predetermined limits in response to a first control signal, means for detecting the envelopes of the radio pulses, means responsive to the time separation between the delayed local pulses and the detected radio pulses to produce said first control signal indicative thereof, means for generating a second control signal in response to the phase difference between the radio pulse cycles and the signal of said local signal source, control means for varying the frequency of said local signal source in response to a control signal, and means for selectively applying to said control means said first control signal when the amplitude thereof is above a predetermined value and said second control signal when the amplitude of said first control signal is below said predetermined value.

2. Apparatus as defined in claim 1 wherein said local signal source and said local pulse generator respectively comprise a crystal-controlled oscillator and a frequency divider chain, the frequency of the oscillator selectively being varied by the first and second control signals.

3. Apparatus as defined in claim 1 wherein said means for selectively applying comprises a single-pole double-throw relay having first and second input contacts, an output contact, and a control terminal, one of said input contacts and said control terminal being interconnected and having said first control signal applied thereto, said second control signal being applied to the other of said input contacts and said output being connected to said control means.

4. Receiving apparatus for phase synchronizing a local pulse source and a local signal source to the envelopes and component carrier cycles, respectively, of received radio pulses, said radio pulses being transmitted with a predetermined phase relationship between the envelopes and the component carrier cycles thereof, said apparatus comprising a local pulse source and a local signal source phase synchronized and harmonically related thereto operating, respectively, at a repetition rate and a frequency substantially the same as those of the radio pulses, the pulses of said local pulse source and the signals of said local signal source having substantially the same predetermined phase relationship therebetween as obtains between the envelope and carrier cycles of said radio pulses, controllable delay means to produce delayed local pulses related to said local pulses over predetermined limits in response to a first control signal, means for detecting and shaping the envelopes of the radio pulses, means responsive to the time separation between the delayed local pulses and the shaped radio pulse envelopes to produce said first control signal indicative thereof, means for generating a second control signal in response to the phase difference between the radio pulse cycles and the signal of said local signal source, control means for varying the frequency of said local signal source in response to a control signal, and means for selectively applying to said control means said first control signal when the amplitude thereof is above a predetermined value and said second control signal when the amplitude of said first control signal is below said predetermined value.

5. Apparatus as defined in claim 4 wherein said means for detecting and shaping the envelopes of the radio pulses comprises an amplitude detector and a circuit arranged to take the derivative of the output of said amplitude detector and combine it with the inverse of said output.

6. Pulse synchronizing apparatus responsive to incoming pulses of fixed repetition rate, said apparatus comprising a source of local pulses having a variable repetition rate, controllable delay means to produce delayed local pulses time-related to said local pulses over predetermined limits as a function of a control signal, a pulse time comparator responsive to said incoming pulses and said delayed local pulses to produce control signal indicative of the time displacement therebetween, means to vary the repetition rate of said source of local pulses, and means for coupling to said last named means said control signal whereby said delayed local pulses are brought into time synchronism with said incoming pulses.

7. A phase sensitive electrical servo of the null-seeking feedback type operative to maintain a minimum servo error signal while permitting limited phase departure between the servo control signal and the servo feedback signal, said apparatus comprising a source of servo control signal, means for generating a servo feedback signal of similar phase characteristic to that of the control signal, means for delaying said feedback signal within predetermined limits to produce a delayed signal related to said feedback signal in response to and as a function of the amplitude of an error signal, and a phase comparator responsive to said control and delayed signals to produce said error signal having an amplitude indicative of the phase displacement therebetween.

8. In an automatic cycle matching receiver of the fixed-phase type having synchronously operative envelope and cycle matching servos for respectively comparing the phase of the envelopes of received pulsed oscillations with that of locally generated pulses and for comparing the phase of the carrier of said received pulsed oscillations with that of a locally generated signal, the frequency of said locally generated pulses being subharmonically related to the frequency of said locally generated signal and said pulses and signal bearing the same relative phase as that obtaining between the envelopes and carrier and said received pulsed oscillations, wherein the envelope servo error signal and the cycle servo error signal selectively control the frequency of said source of locally generated signal depending upon the amplitude of the envelope servo error signal, means for divorcing over predetermined limits the operation of the envelope servo from that of the cycle servo, said means comprising controllable delay means having two inputs and producing an output, means for applying said locally generated pulses to one of said inputs, means for applying said envelope servo error signal to the other of said inputs, and means for connecting the output of said controllable delay means to the feedback signal input of the error signal generating means of said envelope servo, said controllable delay means being operative to vary by less than the period of said locally generated signal the time of occurrence of the locally generated pulses applied thereto as a function of the amplitude of said envelope servo error signal.

No references cited.